United States Patent [19]

Wang et al.

[11] Patent Number: 5,402,486
[45] Date of Patent: Mar. 28, 1995

[54] EARRING COMPATIBLE TELEPHONE HANDSET RECEIVER

[76] Inventors: Xinxin Wang; Jingfang Wu, both of 6609 Oak Tree Trail, Woodridge, Ill. 60517

[21] Appl. No.: 174,833

[22] Filed: Dec. 29, 1993

[51] Int. Cl.6 .................................................. H04M 1/00
[52] U.S. Cl. ............................................. 379/433; 379/434
[58] Field of Search ............... 379/433, 434, 447, 452, 379/428, 429

[56] References Cited

U.S. PATENT DOCUMENTS

| | | | |
|---|---|---|---|
| D. 306,169 | 2/1990 | Burton | D14/249 |
| D. 320,798 | 10/1991 | Holt | D14/249 |
| D. 320,799 | 10/1991 | Holt | D14/249 |
| D. 327,069 | 1/1992 | Tomaszewski | D14/250 |
| 2,501,830 | 3/1950 | Ruml, Jr. | 379/440 |
| 3,231,688 | 1/1966 | Ugartechea | 379/447 |
| 4,827,506 | 5/1989 | Kochan | 379/433 |
| 4,984,268 | 1/1991 | Brown et al. | 379/433 |
| 5,034,979 | 7/1991 | Erickson | 379/447 |

*Primary Examiner*—James L. Dwyer
*Assistant Examiner*—Jack Chiang

[57] ABSTRACT

An earring compatible telephone handset receiver (20) having a side sound outlet (22) and a center sound outlet (24) located on the receiver's front surface. A selection switch (38) is used to determine either the side sound outlet (22), the center sound outlet (24), or both of the side and center sound outlets (22 and 24) to be active for transmitting sound. When the side sound outlet (22) is active and aligned with the user's ear canal (202), the receiver (20) is kept away from the user's ear lobe (206) and the attached earring (204) to accommodate uses wearing earrings. When the center sound outlet (24) is active, the receiver (20) can be used in its normal way to accommodate users without earrings.

14 Claims, 15 Drawing Sheets

EARRING COMPATIBLE TELEPHONE HANDSET RECEIVER

BACKGROUND OF THE INVENTION

The present invention relates to an improved telephone handset receiver, and more particularly to an earring compatible telephone handset receiver which is equally comfortable for all users either with or without earrings.

A conventional telephone handset receiver has a set of circular holes or narrow slots located in the central region of the receiver's front surface. This set of holes or slots is used to transmit sound and is termed a sound outlet. When the receiver is used, its front surface is pushed against the user's ear, and the sound outlet is aligned with the user's ear canal. Thus, the ambient noise is blocked out and the sound generated by the receiver can be heard clearly.

However, discomfort may occur when a conventional telephone handset receiver is used by a user who wears earrings. The earring itself, as well as its mounting hardware, such as a pin, a hook or a clip, may hurt the user's skin when the telephone receiver is pushed against the earring or the ear lobe. This situation becomes even worse if the size of the earring is large, the tip of the pin is sharp or the user has to hold the handset by a shoulder in order to free both hands. To avoid this discomfort, some users will take off their earring before picking up a telephone. Obviously, it is quite inconvenient, especially when doing it many times a day. Nevertheless, some users prefer to wear earrings when they are using a telephone. To avoid the discomfort, they will keep the receiver away from the ear, or move the receiver up so that the lower portion of the receiver will not touch the earring or the ear lobe. In either case, the sound generated from the receiver will become weak, and the ambient noise will become noticeable.

Many attempts have been made to overcome this problem. U.S. Pat. No. Des. 320,799 to Holt (1991), U.S. Pat. No. Des. 306,169 to Burton (1990), U.S. Pat. No. 4,827,506 to Kochan (1989) and U.S. Pat. No. 2,501,830 to Ruml, Jr. (1948), disclose several ways to remove a portion of the receiver's housing to prevent the receiver's body from touching the earrings. However, the portion of the receiver's housing removed is either too small to accommodate a large earring, or too large to prevent the intrusion of the ambient noise. U.S. Pat. No. Des. 327,069 to Tomaszewski (1992) shows a receiver cap with a lower left corner removed. Because of this unsymmetrical design, this receiver cannot be used on the right side ear. U.S. Pat. No. Des. 320,798 to Holt (1991) and U.S. Pat. No. 3,231,688 to Ugartechea (1966) propose to use adopters with a small front surface. Because there is only a small area contacting the ear, discomfort will occur when the receiver is held by a shoulder and pushed tightly against the ear. Furthermore, since these structures have to be completely removed before a telephone receiver can be used in its normal way, the forgoing permanently modified receiver structures are not suitable for a telephone shared within multiple users. U.S. Pat. No. 5,034,979 to Erickson (1991) proposes a hinged earpiece adapter structure. The drawback of this approach is that a large adapter must be physically moved away in order to restore the normal operation mode, and it is inconvenient to use a telephone with a big adapter hanging aside. In addition, its complicated structure cannot withstand certain rough usages encountered by a public telephone or a telephone used in a working environment.

SUMMARY Of THE INVENTION

A principal feature of the present invention is the provision of an improved earring compatible telephone handset receiver, which is equally comfortable for all users either with or without earrings.

The telephone handset receiver of the present invention comprises means for positioning a sound outlet close to the lower side edge of the receiver, means for providing multiple sound outlets on a receiver's front surface, means for selecting one or more sound outlets to be active at a given time for transmitting sound, and means for converting a conventional handset receiver into an earring compatible one.

A feature of the present invention is the provision of a telephone handset receiver structure having a side sound outlet close to the lower side edge on the receiver's front surface. This side sound outlet consists of a set of circular holes or narrow slots used to transmit sound from the receiver's housing. When this side sound outlet is aligned with the user's ear canal, the receiver's body will not touch the user's ear lobe, nor the earring attached. Therefore, this handset receiver structure can accommodate virtually any sizes and styles of earrings. Since this receiver has a large front surface, it provides a comfortable usage even when the handset is held by a shoulder. Furthermore, this large front surface blocks out ambient noise to maintain a desired acoustical efficiency.

Yet another feature of the invention is that two sound outlets can be made on the receiver's front surface. A side sound outlet is positioned near the lower side edge of the front surface, and a center sound outlet is positioned in the central region of the front surface.

A further feature of the invention is that either one or both sound outlets can be active at a given time to transmit sound from the receiver. When only the side sound outlet is active, the receiver is in its "earring" mode to accommodate users wearing earrings. When only the center sound outlet is active, the receiver is in its "normal" mode to accommodate users without earrings. When both of these outlets are active, the receiver is in its "common" mode to accommodate any user with or without earrings.

Another feature of the invention is that it is not necessary to detach any adopter, nor to disassemble the handset receiver in order to change the operation mode. Since this receiver structure is easy to use and very durable, it can be implemented not only on a home or office telephone but also on a public telephone.

Yet another feature of the invention is that a mechanical shutter can be utilized to select either the side sound outlet, the center sound outlet or both sound outlets to be active at a given time for transmitting sound.

A further feature of the invention is that a single speaker can be moved inside the receiver's housing to transmit sound from the side, the center or both of these two sound outlets.

Still another feature of the invention is that two speakers can be mounted inside the receiver's housing, one under each sound outlet. An electrical switch can be utilized to select an active speaker.

Another feature of the invention is that the shape, as well as the overall size of the conventional receiver's housing can be kept unchanged. Therefore, less parts of the telephone handset need to be redesigned in order to implement this earring compatible receiver structure.

Yet another feature of the invention is that an add-on adapter can be utilized to convert an existing conventional receiver into an earring compatible one. This adapter can be easily switched between the "earring" mode and the "normal" mode, even if it is permanently attached to the existing receiver.

Further features will become more fully apparent in the following description of the embodiments of this invention, and from the appended claims.

BRIEF DESCRIPTION OF THE DRAWINGS

In the drawings:

FIG. 11 is an enlarged fragmentary sectional view of the third embodiment along line 3—3 of FIG. 9 in the direction of the arrows, wherein

FIG. 13A and 13B are fragmentary front elevational views of the fourth embodiment shown in FIG. 12 in the direction of arrow A shown in FIG. 12, wherein FIG. 13A shows the receiver's "normal" mode, and FIG. 13B shows the "earring" mode;

FIGS. 18A and 18B are enlarged sectional views of a fifth embodiment of a telephone handset receiver of the present invention with a single sliding speaker, wherein FIG. 18A shows the receiver's "normal" mode, and FIG. 18B shows the "earring" mode;

FIGS. 22A and 22B are sectional views of the adapter along line 6—6 of FIG. 20 in the direction of the arrows, wherein FIG. 22A shows the adapter's "normal" mode, and FIG. 22B shows the "earring" mode.

DESCRIPTION OF THE PREFERRED EMBODIMENTS

Figure 1:
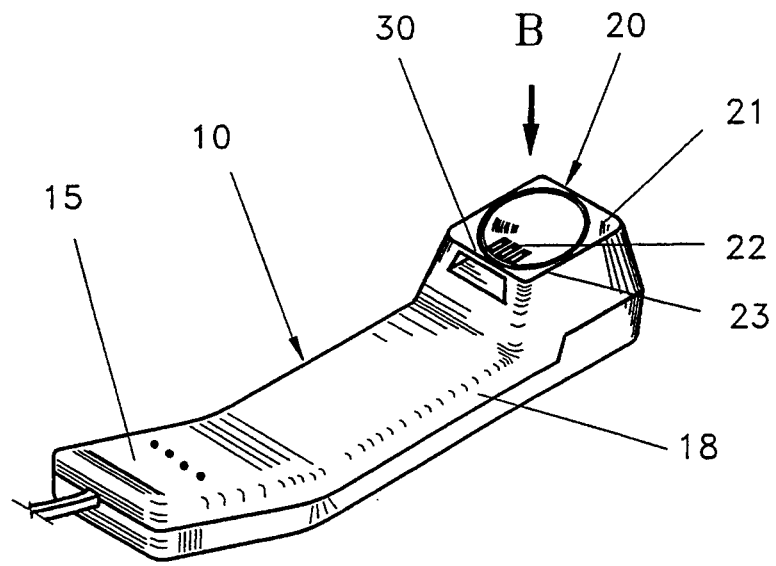
FIG. 1 is a reduced-sized front and right side perspective view of a first embodiment of an earring compatible telephone handset receiver of the present invention having a side sound outlet.
Figure 2:
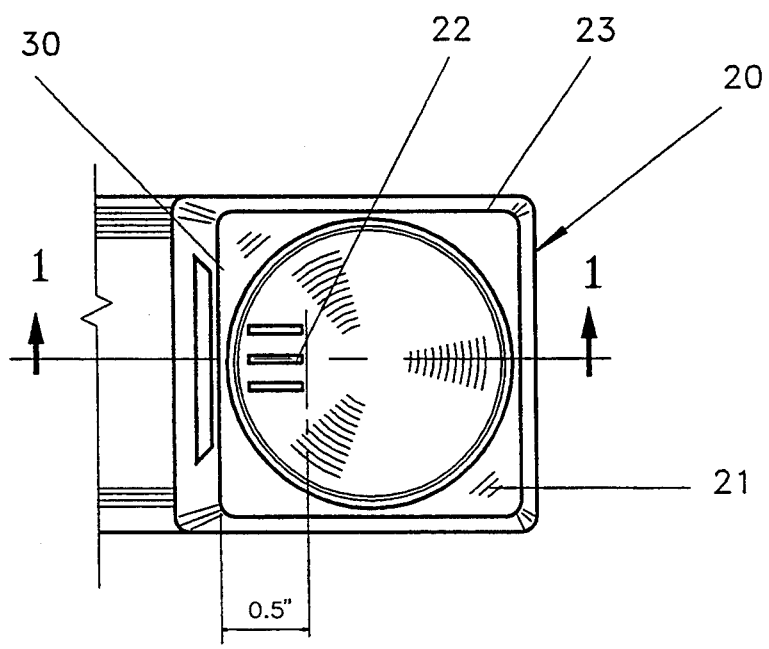
FIG. 2 is a fragmentary front elevational view of the first embodiment in the direction of arrow B shown in FIG. 1.

Referring to FIG. 1, a telephone handset generally designated 10 incorporating a first embodiment of an earring compatible receiver generally designated 20 in accordance with the present invention is illustrated. The telephone handset 10 has an elongated handle section 18 with a transmitter 15 in one end, and a receiver 20 in the other end. The transmitter 15 is sometimes also called the mouthpiece of the telephone handset 10. In this receiver embodiment, the receiver 20 has a flat peripheral ear-contacting area 21 with a rectangular-shaped, non-interrupted outside edge 23, a portion of which is designated as a lower side edge 30, and a side sound outlet 22 is located near the middle of the receiver's lower side edge 30. Side sound outlet 22 may consist of a group of narrow slots or circular wholes. Slots are used for illustration purpose only. FIG. 2 is a fragmentary front elevational view of this embodiment in the direction of arrow B shown in FIG. 1. As shown in FIG. 2, the side sound outlet 22 is located in a border region which is about 0.5 inches wide along the lower side edge 30.

Figure 3:
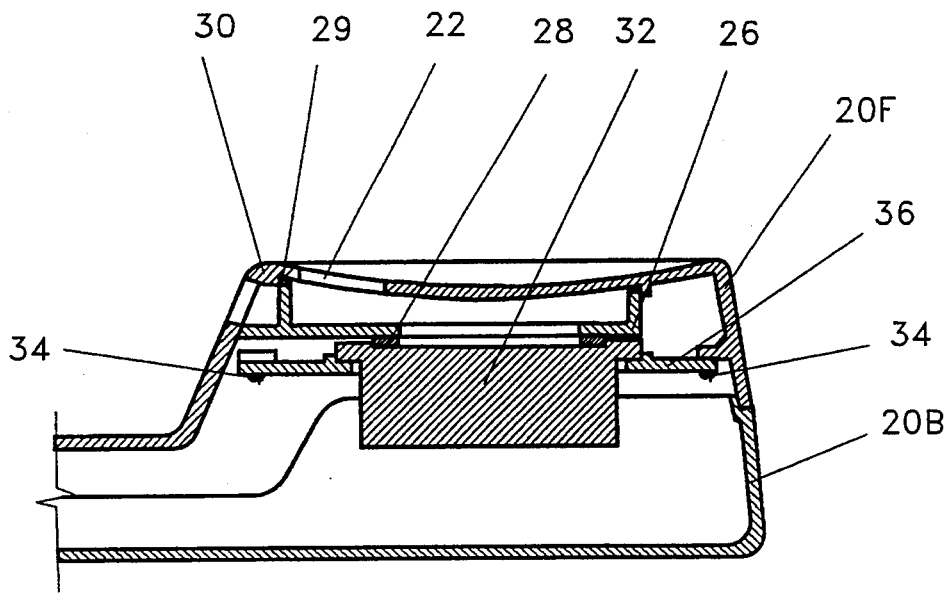
FIG. 3 is an enlarged fragmentary sectional view of the first embodiment along line 1—1 of FIG. 2 in the direction of the arrows.

FIG. 3 shows a sectional view of the handset receiver 20 along line 1—1 of FIG. 2 in the direction of the arrows. The receiver's housing consists of a front cover 20F and a back cover 20B. A side sound outlet 22 is located on the front cover 20F near the center of the receiver's lower side edge 30. A sound chamber 26 is mounted underneath the front cover 20F to conduct sound from a speaker 32 to the side sound outlet 22. Mounting bracket 36 and screws 34 are used to secure both the speaker 32 and the sound chamber 26 to the front cover 20F. Gaskets 28 and 29 are installed to provide an airtight connection between the speaker 32 and the front cover 20F.

Figure 4:
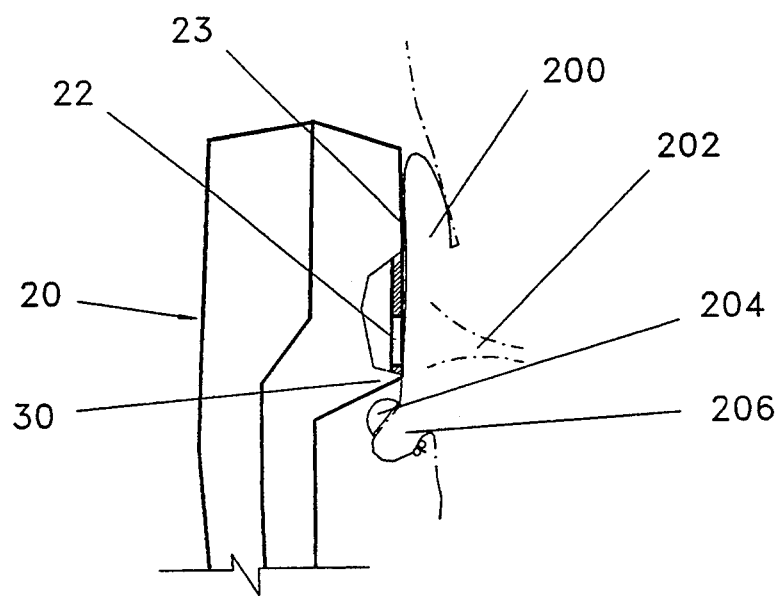
FIG. 4 is a fragmentary side elevational view of the first embodiment being used by an earring-wearing-user, with a portion shown in section for illustration purpose.

FIG. 4 illustrates how the telephone handset receiver of the present invention is used by a user who wears an earring. When it is used, the handset receiver 20 is pushed against the user's ear 200, the outside edge 23 of the ear-contacting area 21 covers almost the entire user's ear 200 except the ear lobe 206, as shown in FIG. 4, and the side sound outlet 22 is aligned with the user's ear canal 202. Since the side sound outlet 22 is directly facing the ear canal 202, sound generated from the receiver's speaker 32 can be heard clearly. Because the receiver's lower side edge 30 is less than one half of an inch away from the center of the side sound outlet 22, the handset receiver 20 will not touch the user's ear lobe 206, nor the earring 204 attached to the ear lobe 206. Thus, the handset receiver of the present invention can accommodate virtually any sizes and styles of earrings. Furthermore, the large contact area between the front surface of the receiver and the user's ear blocks out the ambient noise. Therefore, the handset receiver of the present invention provides both the desired acoustical efficiency and the comfortableness to users wearing earrings.

Figure 5:
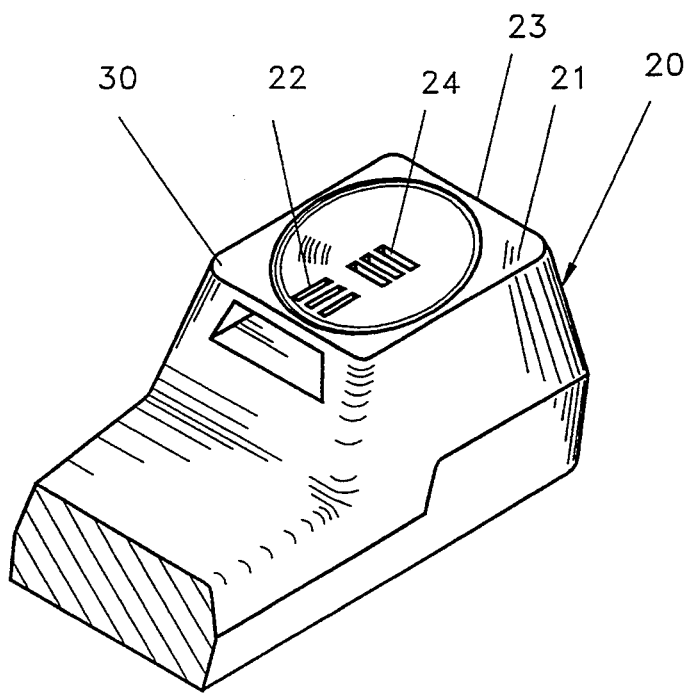
FIG. 5 is a fragmentary front and right side perspective view of a second embodiment of a telephone handset receiver of the present invention with two sound outlets.
Figure 6:
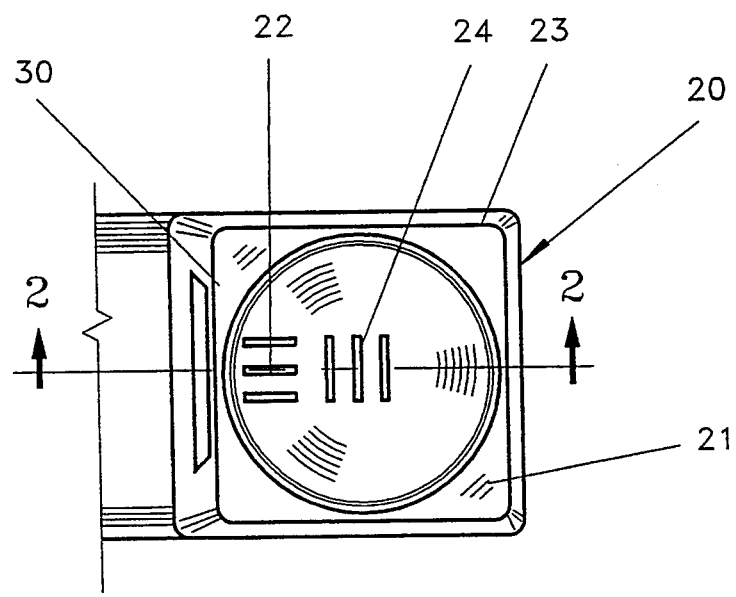
FIG. 6 is a fragmentary front elevational view of the second embodiment shown in FIG. 5.
Figure 7:
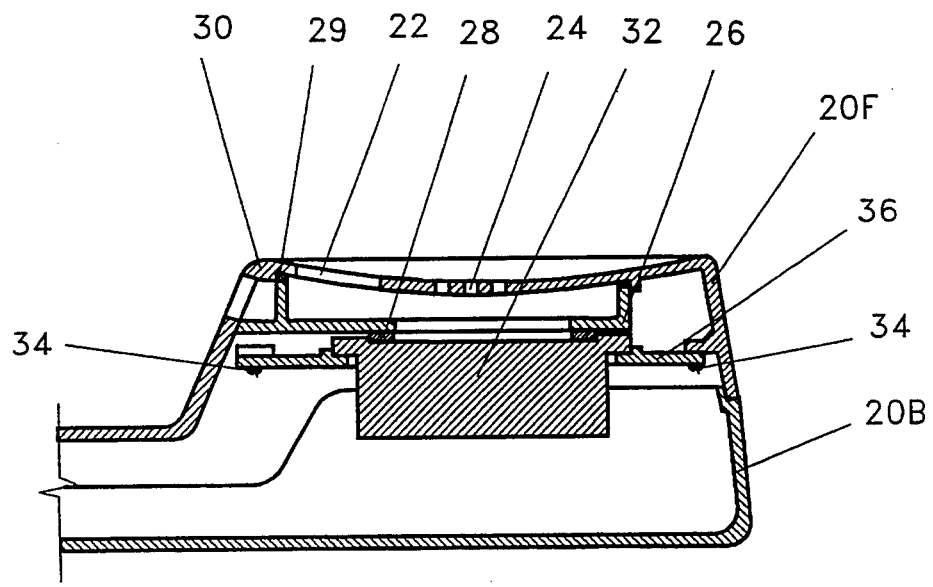
FIG. 7 is an enlarged fragmentary sectional view of the second embodiment along line 2—2 of FIG. 6 in the direction of the arrows.

FIG. 5 and FIG. 6 show a second embodiment of the present invention where two sound outlets are placed on the front surface of the receiver 20. A center sound outlet 24 is located in the central region of the receiver 20. A side sound outlet 22 is located near the lower side edge 30 of the receiver 20. This receiver can accommodate users either with or without earrings. FIG. 7 shows a sectional view along line 2—2 of FIG. 6 in the direction of the arrows. Similar to the first embodiment shown in FIG. 3, there is a sound chamber 26 located underneath the receiver's front cover 20F. Mounting bracket 36 and screws 34 are used to fix the speaker 32 and the sound chamber 26 to the front cover 20F. Gaskets 28 and 29 provide an airtight connection between the speaker 32 and the sound chamber 26, and between the sound chamber 26 and the front cover 20F, respectively. The sound generated from the speaker 32 can be transmitted through the center sound outlet 24 and the side sound outlet 22 simultaneously.

When this handset receiver is used by a person who wears an earring, the side sound outlet 22 is aligned with the user's ear canal. Since the center sound outlet 24 is blocked by the user's ear, most of the audio energy generated by the speaker 32 is transmitted into user's ear through the side sound outlet 22. Similar to the situation shown in FIG. 4, the receiver's body will contact neither the ear lobe, nor the earring attached to the ear lobe. When this handset receiver is used by a person who does not wear any earring, the handset receiver is used in its normal way, such that the center sound outlet 24 is aligned with the user's ear canal. Since the side sound outlet 22 is blocked by user's ear lobe, most of the audio energy generated by the speaker 32 is transmitted into user's ear through the center sound outlet 24. In this situation, this handset receiver is used just like a conventional handset receiver. This handset receiver embodiment accommodates all users whether they wear earrings or not. Because there are no adapters or parts which have to be detached in order to change the operation mode, this handset receiver embodiment is very convenient if the telephone is shared within multiple users.

Figure 8:
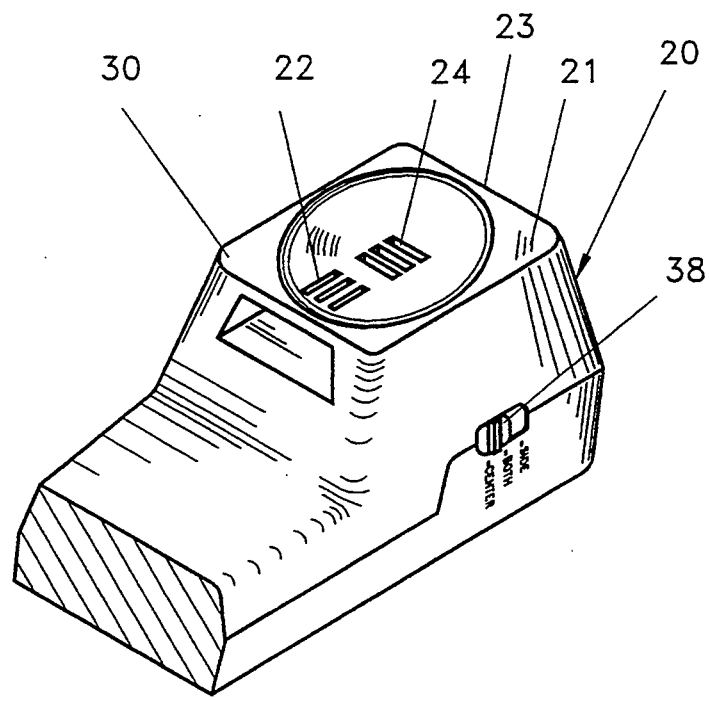
FIG. 8 is a fragmentary front and right side perspective view of a third embodiment of a telephone handset receiver of the present invention with two sound outlets and a mechanical outlet selection scheme.
Figure 9:
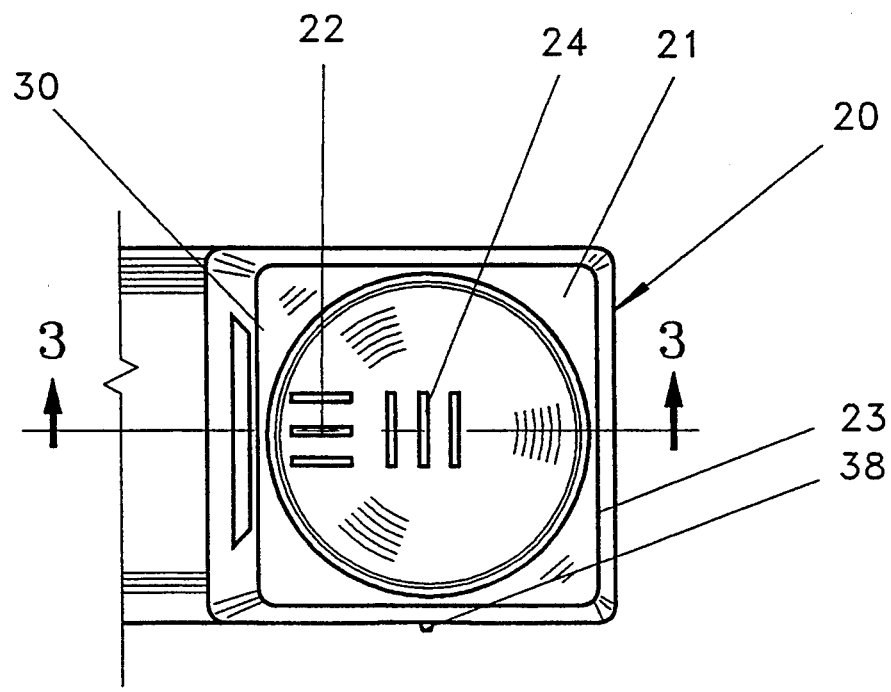
FIG. 9 is a fragmentary front elevational view of the third embodiment shown in FIG. 8.

FIGS. 8, 9, 10 and 11 show a third embodiment of the present invention. In this embodiment, two sound outlets, a center sound outlet 24 and a side sound outlet 22, are located on the receiver's front cover 20F. A selection switch 38 is mounted at the side of the receiver's housing 20 to choose a desired operation mode. The selection switch 38 has three working positions, "CENTER", "BOTH" and "SIDE", as shown in FIG. 8.

When the selection switch 38 is in the "CENTER" position as shown in FIG. 8, only the center sound outlet 24 is active for transmitting sound. Thus, the receiver is in its "normal" mode and functions exactly like a conventional handset receiver. When the selection switch 38 is in the "BOTH" position, both the center sound outlet 24 and the side sound outlet 22 are active for transmitting sound. The receiver is in its "common" mode and functions exactly like the second embodiment shown in FIGS. 5, 6 and 7. When the selection switch 38 is in its "SIDE" position, only the side sound outlet 22 is active for transmitting sound. The receiver is in its "earring" mode and functions exactly like the first embodiment shown in FIGS. 1, 2, 3 and 4.

Figure 10:
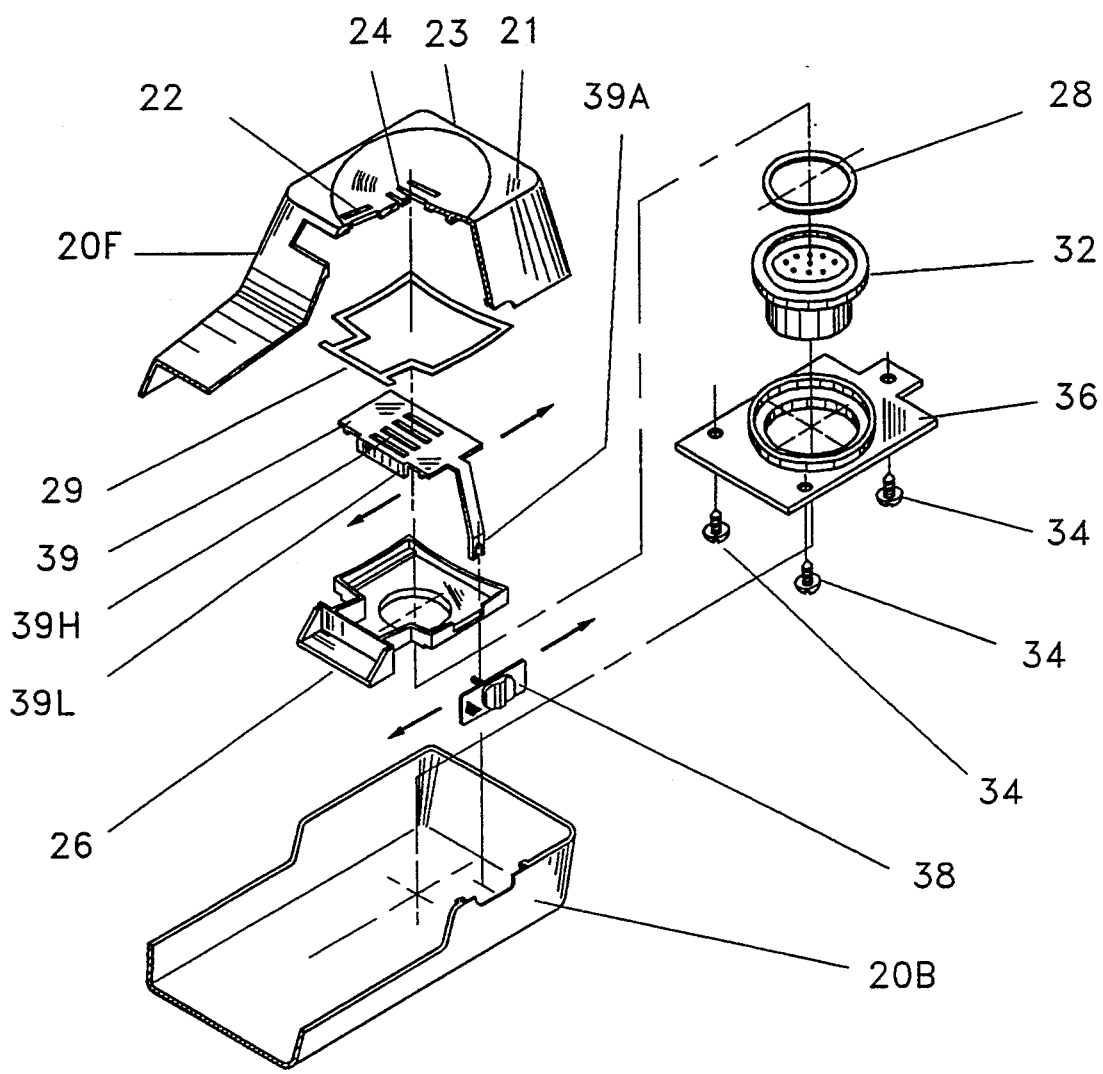
FIG. 10 is a reduced-sized front and right side perspective view of the third embodiment show in FIGS. 8 and 9 in a disassembled state.

FIG. 10 shows the third embodiment in a disassembled state. In addition to a front cover 20F, a back cover 20B, two gaskets 28 and 29, a sound chamber 26, a speaker 32, a mounting plate 36 and three mounting screws 34, which can be found in the second embodiment shown in FIG. 7, this embodiment has a selection switch 38 and a shutter 39. The shutter 39 is mounted inside the sound chamber 26, and its fork-shaped arm 39A is connected to the selection switch 38. When the selection switch 38 slides along the arrows shown in FIG. 10, the shutter 39 will slide accordingly inside the sound outlet 26. There are four slotted clearance holes 39H on the shutter 39. These slotted holes 39H can provide a sound pass between the speaker 32 and the center sound outlet 24. The leading surface 39L of the shutter 39 is bent down 90 degrees. This "L" shaped leading edge 39L is used to control the sound pass leading to the side sound outlet 22.

Figure 11A:
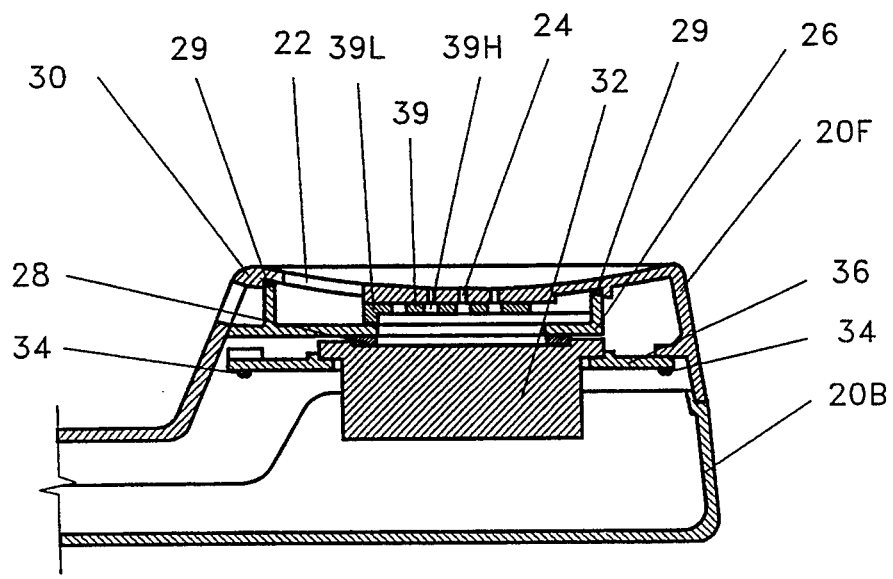
FIG. 11A shows the receiver's "normal" mode.
Figure 11B:
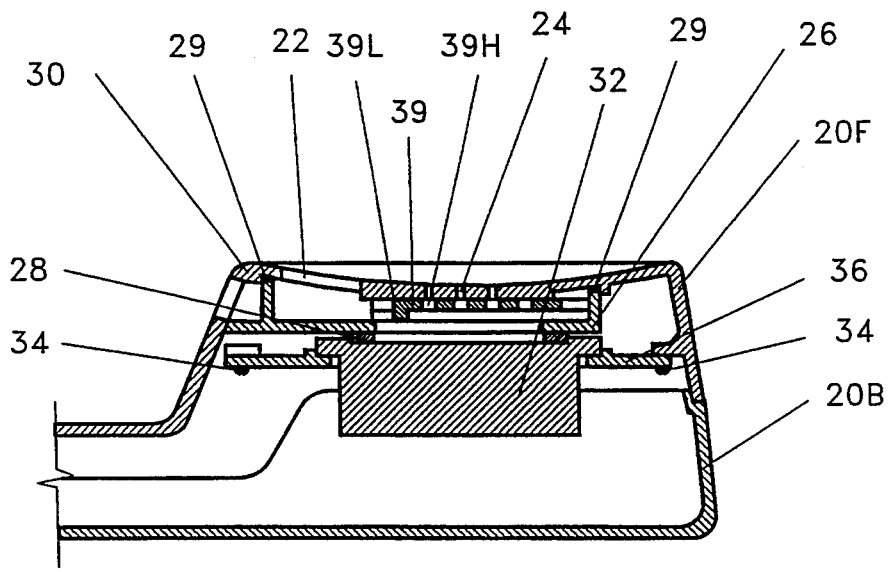
FIG. 11B shows the "common" mode.
Figure 11C:
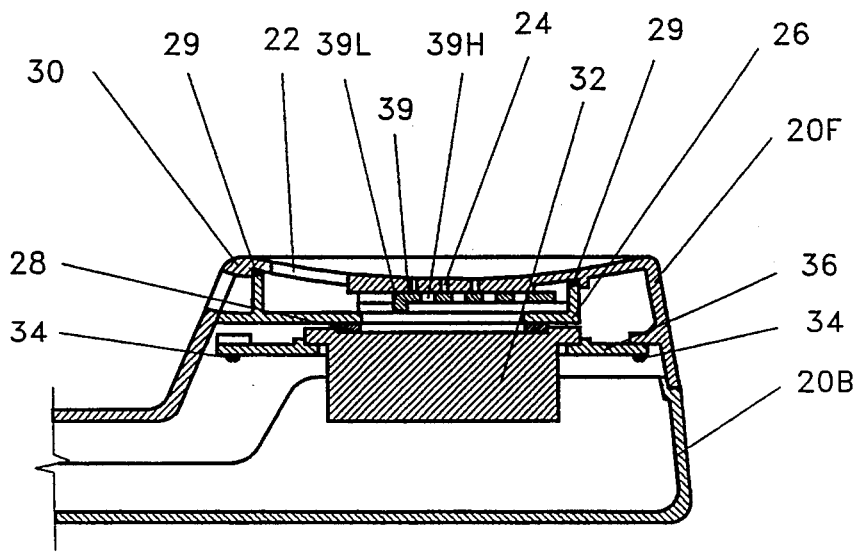
FIG. 11C shows the "earring" mode.

The detailed operational mode control is shown in FIGS. 11A, 11B and 11C. These three figures are very similar to FIG. 7, except that an additional shutter 39 is used in this embodiment and is mounted between the front cover 20F and the sound chamber 26. FIG. 11A shows the receiver's "normal" mode. In this mode, three right most clearance slots 39H are aligned with the center sound outlet 24. The "L" shaped leading edge 39L of the shutter 39 blocks the sound pass from the speaker 32 to the side sound outlet 22. Thus, sound generated from the speaker 32 is transmitted out only through the center sound outlet 24. FIG. 11B shows the receiver's "common" mode. In this mode, three left most clearance slots 39H are aligned with the center sound outlet 24. The "L" shaped leading edge 39L of the shutter 39 leaves a partially opened sound pass from the speaker 32 to the side sound outlet 22. Thus, sound generated from the speaker 32 is transmitted out through both the center sound outlet 24 and the side sound outlet 22. FIG. 11C shows the receiver's "earring" mode. In this mode, the center sound outlet 24 is blocked by the body of the shutter 39. In the mean time, the "L" shaped leading edge 39L of the shutter 39 leaves a wide opened sound pass from the speaker 32 to the side sound outlet 22. Thus, sound generated from the speaker 32 is transmitted out only through the side sound outlet 22.

The above descriptions demonstrate that this embodiment is very flexible. Without detaching or disassembling any parts, this handset receiver embodiment can change operation mode easily. It provides both desired comfortableness and acoustical efficiency to any user, regardless wearing earrings or not. By using the shutter 39, audio energy leakage from the sound outlet which is not facing the user's ear canal can be eliminated. Consequently, sound quality in either the "normal" or the "earring" mode is improved over the second embodiment shown in FIGS. 5, 6 and 7.

Figure 12:
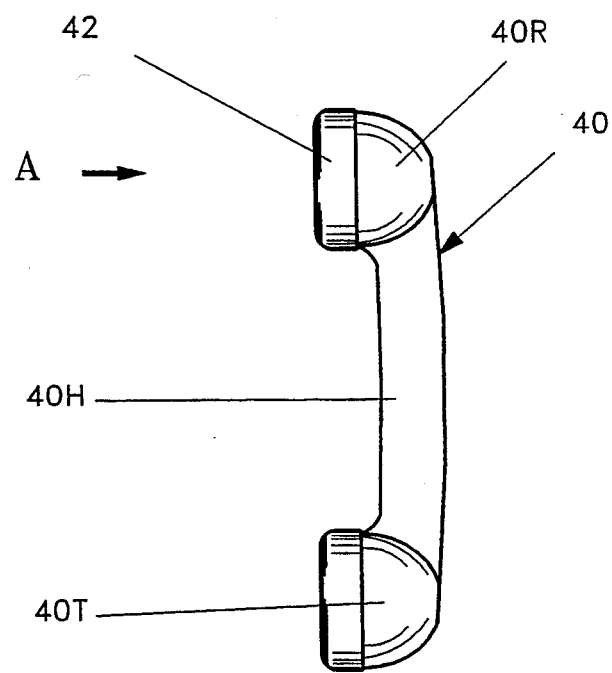
FIG. 12 is a reduced-sized right side elevational view of a fourth embodiment of an old-style telephone handset receiver of the present invention having a rotatable earpiece.

FIGS. 12 to 17 show a fourth embodiment of the present invention. This embodiment is suitable for an old-style telephone handset receiver with a detachable earpiece. As shown in FIG. 12, an old-style telephone handset generally designated 40 consists of a handle 40H, a transmitter 40T and a receiver 40R. A rotatable earpiece 42 according to the fourth embodiment of the present invention is mounted on the receiver 40R. FIGS. 13A and 13B are front views in direction A of FIG. 12. On the front surface of the rotatable earpiece 42, there are two sound outlets named center sound outlet 24 and side sound outlet 22. The center sound outlet 24 consists of 6 circular holes arranged in a circle. The side sound outlet 22 also consists of six holes. These six holes are arranged in two groups. Each group has three holes and is positioned in a radial direction as shown in FIGS. 13A and 13B. A mode pointer 44 is marked on the rim of the earpiece 42, and two position indicators, "CENTER" 43 and "SIDE" 45, are printed on the handset 40 near the earpiece 42. As shown in FIG. 13A, when the earpiece 42 is rotated so that the mode pointer 44 points the "CENTER" indicator 43, only the center sound outlet 24 is active for transmitting sound. Thus, the handset receiver is in its "normal" mode, and can be used in its normal way. When the earpiece 42 is rotated counterclockwise until the mode pointer 44 points the "SIDE" indicator 45, as shown in FIG. 13B, only the side sound outlet 22 is active for transmitting sound. Similar to the previous embodiments, this "earring" mode is used to accommodate users with earrings.

Figure 13A:
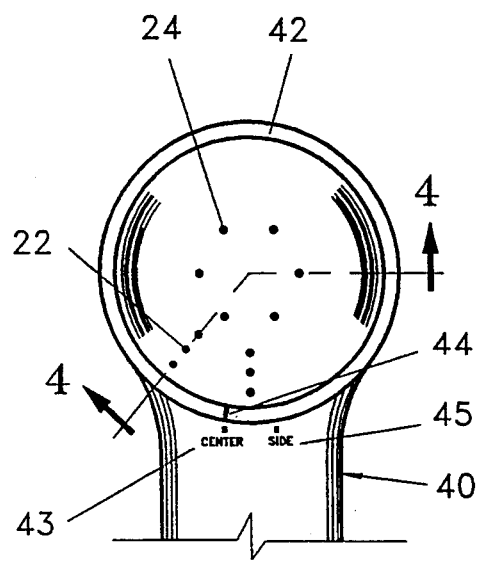
Figure 13B:
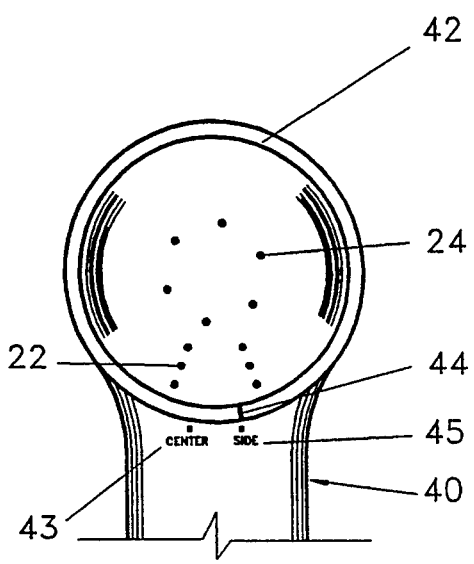
Figure 14:
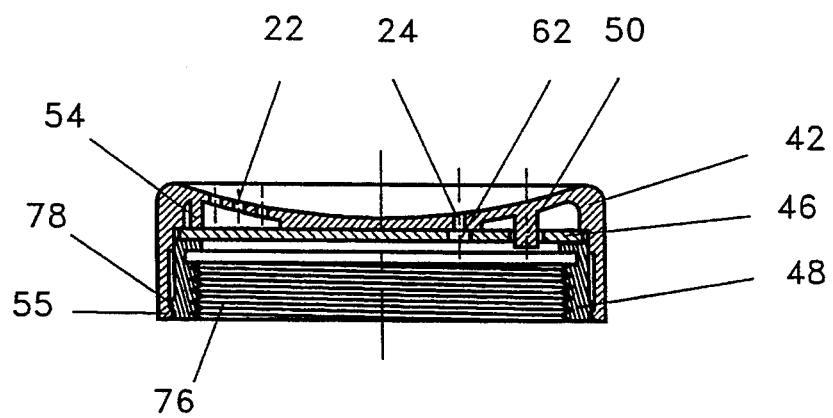
FIG. 14 is an enlarged sectional view of the fourth embodiment along line 4—4 of FIG. 13A in the direction of the arrows.

FIG. 14 is a sectional view along line 4—4 of FIG. 13A in the direction of the arrows. As shown in FIG. 14, this embodiment consists of three parts, a rotatable earpiece 42, a shutter 46 and a threaded adapter ring 48.

Figure 15:
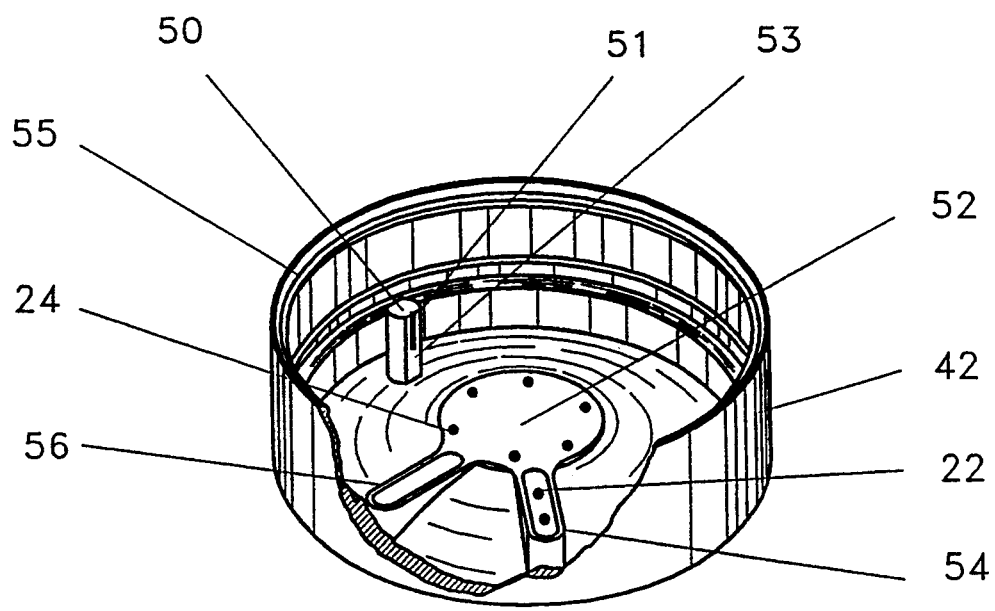
FIG. 15 is an enlarged back side perspective view of a rotatable earpiece of the fourth embodiment shown in FIG. 14 with a portion of the wall removed for the purpose of illustration.

FIG. 15 is a back side perspective view of the rotatable earpiece 42. In the center of the earpiece 42, as shown in FIG. 15, there is a flat round surface 52, where six circular holes are located forming the center sound outlet 24. Near the side of the earpiece 42, there are two elongate oval-shaped shrouds 54 and 56 placed in the radial direction. Each of these shrouds surrounds a group of three holes of the side sound outlet 22. Only two such holes surrounded by shrouds 54 are visible in FIG. 15. The remaining four holes are blocked by the shrouds and cannot be seen in FIG. 15. The bottom surfaces of shrouds 54 and 56 are leveled with the round surface 52. A rotation-limit post 50 is made inside the earpiece 42. This rotation-limit post 50 has two flat surfaces 53. Each surface 53 has a linear indentation 51 on it. Only one surface 53 and one indentation line 51 can be seen in FIG. 15. A latching ring 55 is made near the bottom edge of the earpiece 42.

Figure 16:
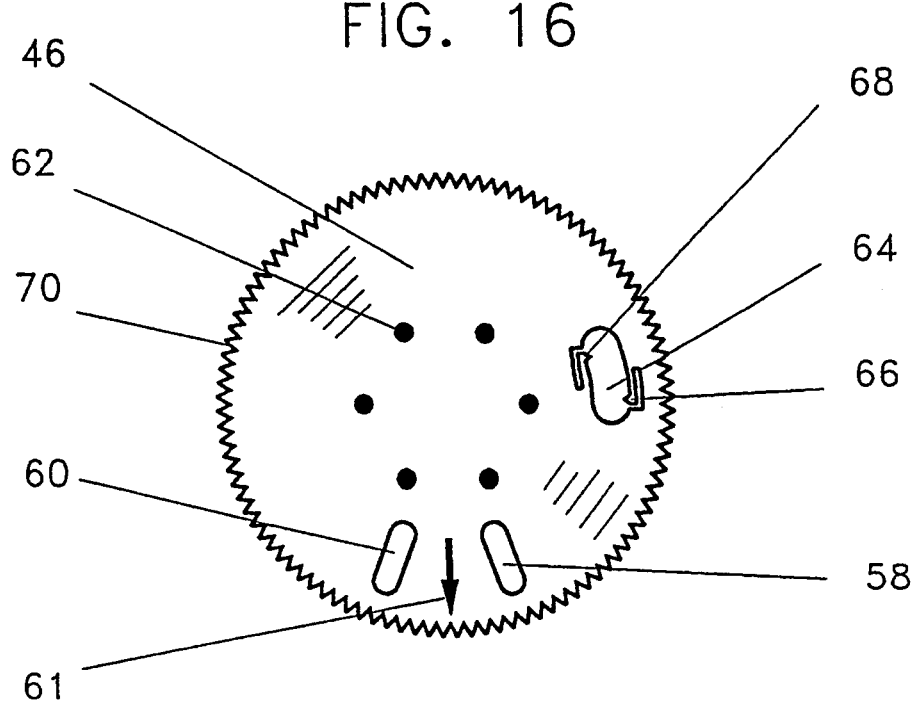
FIG. 16 is an enlarged front side elevational view of a shutter piece of the fourth embodiment shown in FIG. 14.

FIG. 16 shows a front view of the shutter 46. The shutter 46 is a circular piece with many fine teeth 70 on the circumference. Six clearance holes 62 are located near the center of the shutter 46 to accommodate the center sound outlet 24 located on the earpiece 42. Two open slots 58 and 60 are cut in the radial direction to accommodate shrouds 54 and 56 also on the earpiece 42. An arrow head 61 is printed on the center line between slot 60 and slot 58. This arrow head 61 is used to align the shutter 46 with the handset receiver 40R. A rotation-limit slot 64 and two latches 66 and 68 are used to restrain the movement of the rotation limit post 50 and latch it in position.

Figure 17:
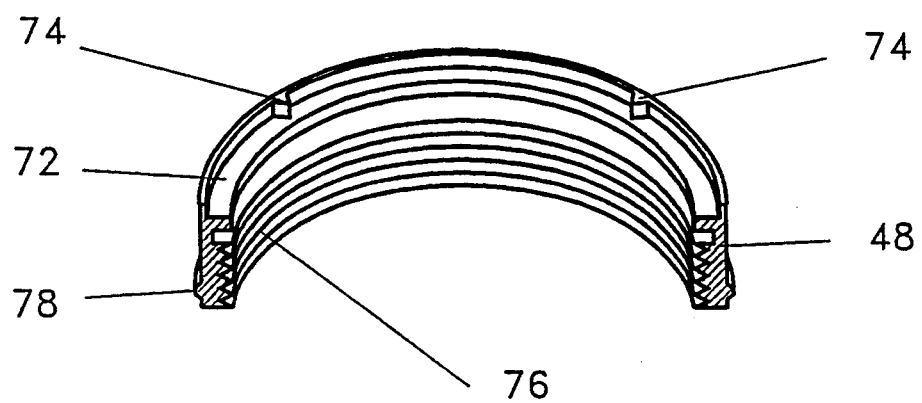
FIG. 17 is an enlarged front side perspective and sectional view of an adapter ring of the fourth embodiment shown in FIG. 14.

FIG. 17 shows a perspective sectional view of the threaded adapter ring 48. A top surface 72 is used to support the shutter 46. Four teeth 74 (only two of them are shown in FIG. 17) can fit between teeth 70 and lock the shutter 46 in position. A latching ring 78 is located on the outer surface of the threaded ring 48 to hold the rotatable earpiece 42 in position. Thread 76 in the inner surface of the threaded adapter ring 48 is used to accommodate the male thread on the handset receiver 40R.

To assemble this earpiece, first thread the threaded adapter ring 48 on to the male thread on the old-style handset receiver 40R and tighten it up. Then, place the shutter 46 on the top surface 72 of the threaded adapter ring 48 so that the arrow head 61 on the shutter 46 is positioned in the middle of the "CENTER" indicator 43 and the "SIDE" indicator 45 located on the handset receiver 40. Next, put the rotatable earpiece 42 over the threaded adapter ring 48 and let the rotation-limit post 50 on the earpiece 42 go through the rotation-limit slot 64 on the shutter. Finally, push the rotatable earpiece 42 down so that the latching ring 55 on the inner surface of the rotatable earpiece 42 latches the latching ring 78 on the outer surface of the threaded ring 48 as shown in FIG. 14.

To set the "normal" mode, hold the handset receiver 40 and rotate the rotatable earpiece 43 clockwise until the rotation-limit post 50 on the rotatable earpiece 42 is stopped by the rotation-limit slot 64 and latched by the latch 66 on the shutter 46. The mode pointer 44 points the "CENTER" indicator 43. At this time, six clearance holes 62 on the shutter 46 are aligned with the center sound outlet 24. Thus, sound is transmitted out through the clearance holes 62 and the center sound outlet 24. At the same time, two shrouds 54 and 56, as well as the side outlet 22, are blocked by the shutter 46. Thus, the side sound outlet 22 is inactive.

To set the "earring" mode, hold the handset receiver 40 and rotate the rotatable earpiece 42 counterclockwise until the rotation-limit post 50 on the rotatable earpiece 42 is stopped by the rotation-limit slot 64 and latched by the latch 68 on the shutter 46. The mode pointer 44 points the "SIDE" indicator 45. At this time, two shrouds 54 and 56 on the rotatable earpiece 42 are aligned with two slots 60 and 58, respectively. Thus, sound is transmitted out through two slots 60 and 58, two shrouds 54 and 56, and the side sound outlet 22. At the same time, the center sound outlet 24 is blocked by the shutter 46 and is inactive.

By simply rotating the earpiece 42 a small angle, the operation mode can be easily changed to accommodate users either with or without earrings. Due to its simple operation and compact structure, this embodiment is very suitable for a public telephone.

Figure 18A:
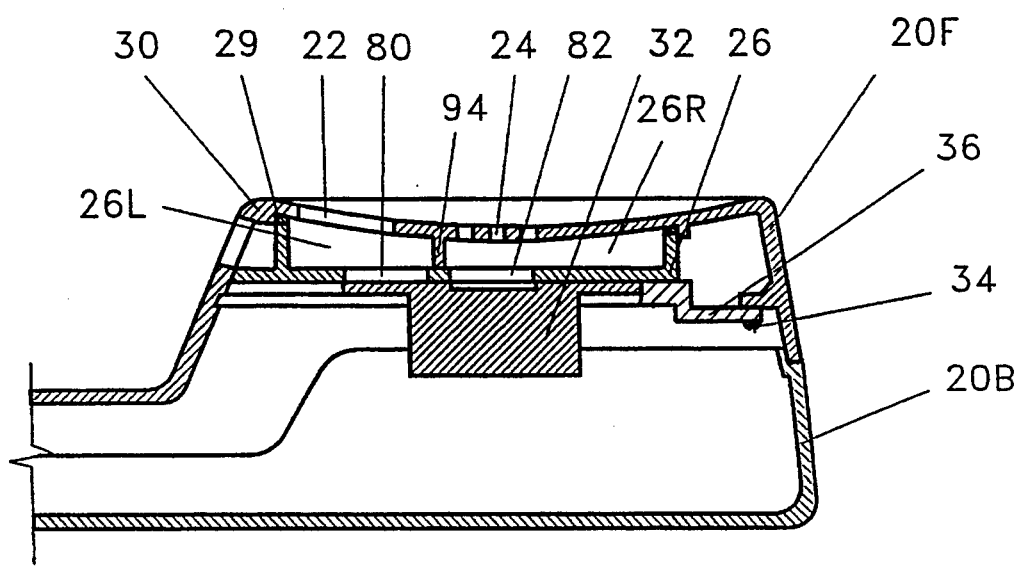
Figure 18B:
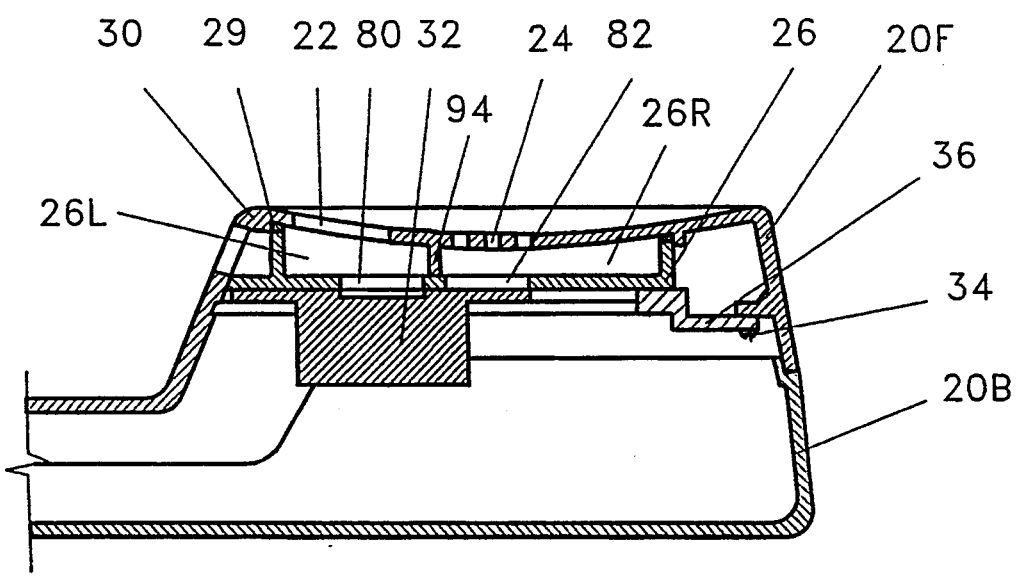

FIGS. 18A and 18B show a fifth embodiment of the present invention utilizing a sliding speaker. Similar to the third embodiment shown in FIGS. 8, 9, 10 and 11, there are two sound outlets located on the front cover 20F. The center sound outlet 24 is positioned in the central region of the receiver's front surface and the side sound outlet 22 is positioned near the receiver's lower side edge 30. A gasket 29 and a sound chamber 26 are mounted underneath the front cover 20F to conduct sound from the speaker 32 into the sound outlets 24 and 22. There are two circular holes 80 and 82 located on the bottom surface of the sound chamber 26. A thin wall 94 on the front cover 20F partitions the sound chamber 26 into two separate channels, a left channel 26L and a right channel 26R. A bracket 36 and mounting screw 34 are used to secure the sound chamber 26 and the gasket 29 in position. The bracket 36 also provides a sliding track for the speaker 32 to move left and right. As shown in FIG. 18A, the speaker 32 is aligned with the hole 82. Thus sound generated from the speaker 32 is transmitted out through the hole 82, the right channel 26R and the center sound outlet 24. In this mode, the telephone handset receiver can be used in its normal way. If the speaker 32 is moved to the left side, as shown in FIG. 18B, the sound generated from the speaker 32 is transmitted out through the hole 80, the left channel 26L and the side sound outlet 22. In this mode, the telephone handset receiver can accommodate a user with earrings.

Figure 19:
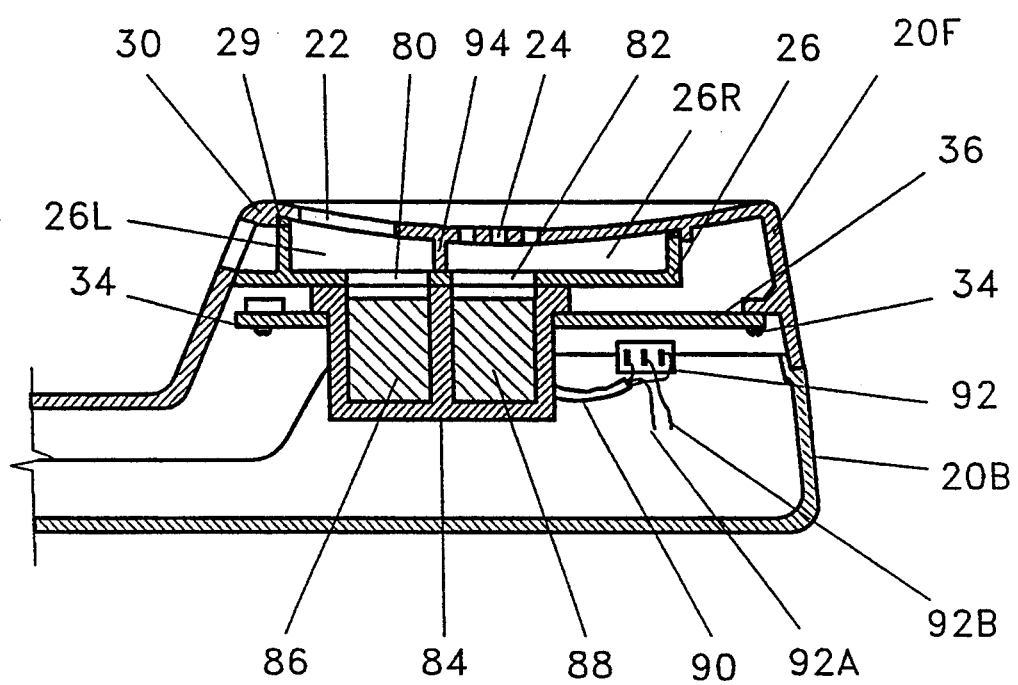
FIG. 19 is an enlarged sectional view of a sixth embodiment of a telephone handset receiver of the present invention with two speakers and an electrical switch.

FIG. 19 shows a sixth embodiment of the present invention. Instead of using a sliding speaker structure shown in FIGS. 18A and 18B, this embodiment uses a dual speaker structure. A speaker assembly 84 consists of two separate speakers 86 and 88. The speaker 86 is aligned with the hole 80 and can transmit sound through the side sound outlet 22. The speaker 88 is aligned with the hole 82 and can transmit sound through the center sound outlet 24. Cable 90 connects speakers 86 and 88 to a switch 92. Two electrical wires 92A and 92B are used to connect these two speakers 86 and 88 to a speaker driving circuitry which is not shown in this figure. By toggle the switch 92, either speaker 86 or speaker 88 can be connected to the speaker driving circuitry to generate sound. Because there are no moving parts in this structure, this embodiment is more reliable.

Figure 20:
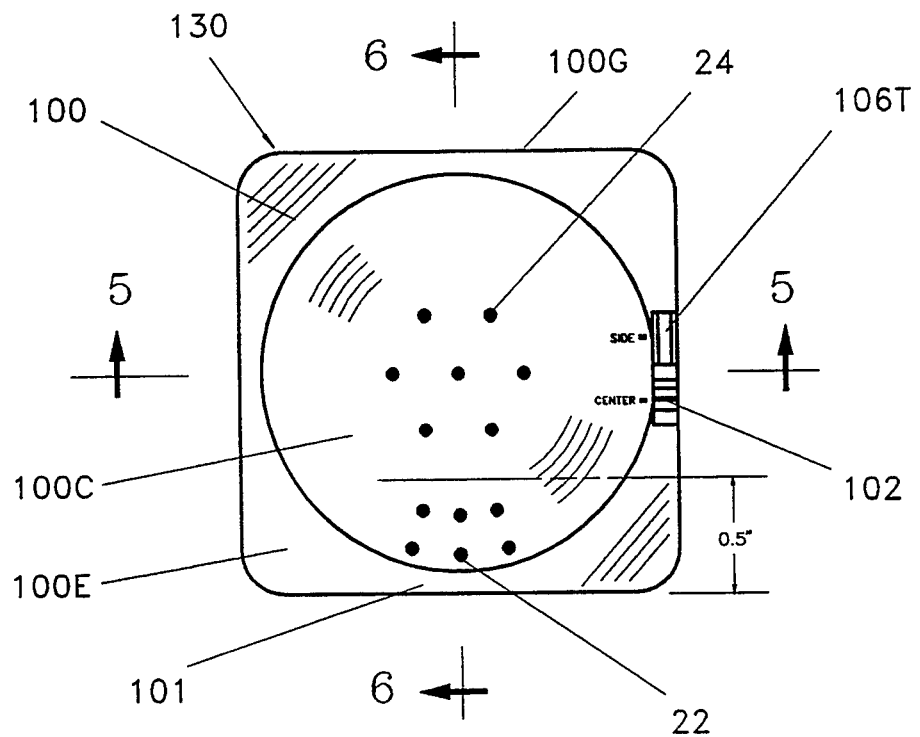
FIG. 20 is an enlarged front elevational view of an adapter of a telephone handset receiver of the present invention with two sound outlets and a mechanical outlet selection scheme.
Figure 21:
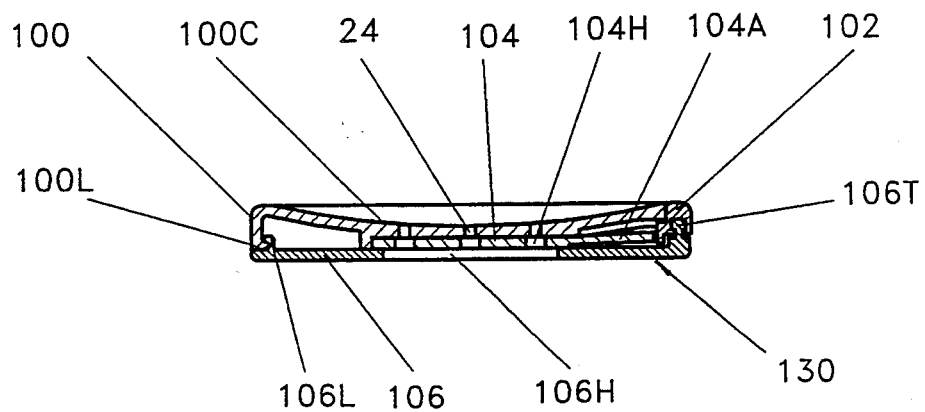
FIG. 21 is a sectional view of the adapter along line 5—5 of FIG. 20 in the direction of the arrows.
Figure 22A:
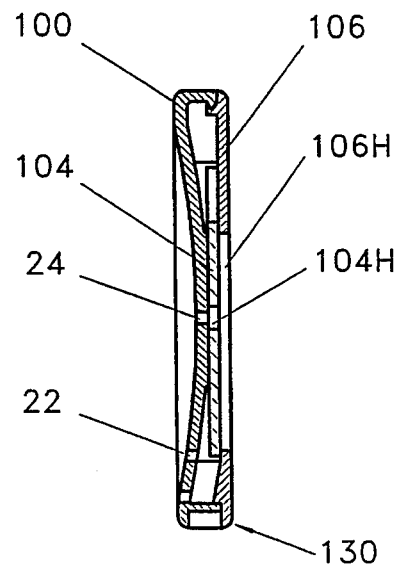
Figure 22B:
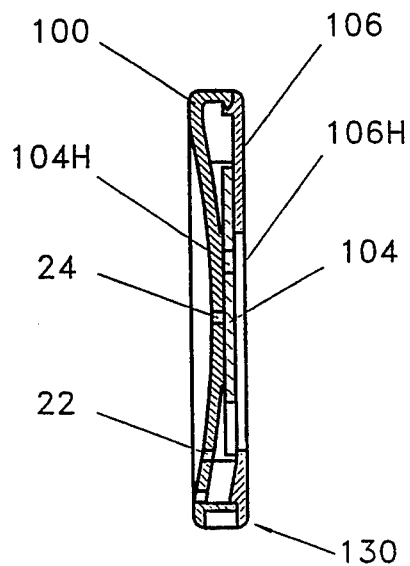
Figure 23:
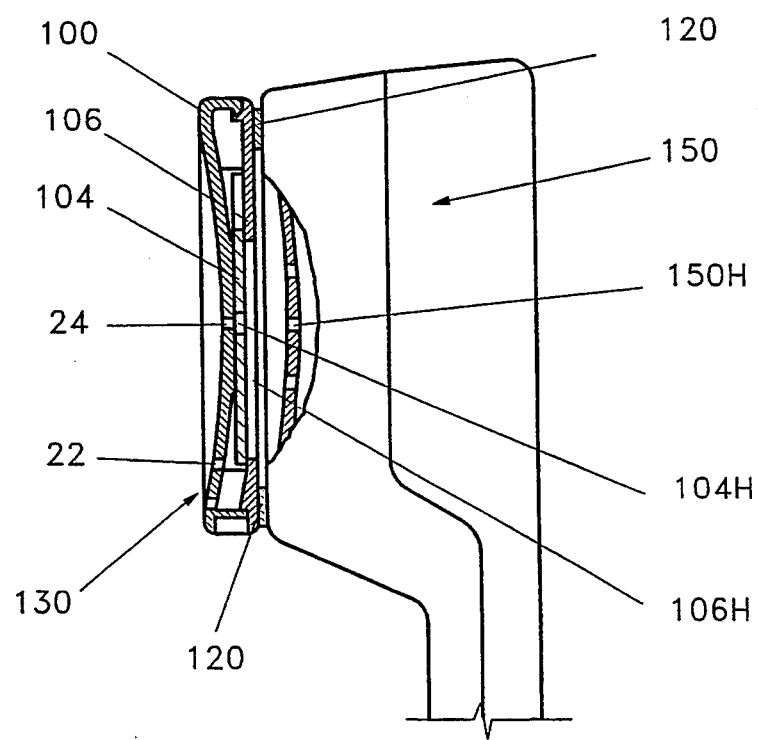
FIG. 23 is a side elevational view of the adapter mounted to a conventional handset receiver with some portions shown in section for illustration purpose.

FIGS. 20, 21, 22 and 23 show an adapter embodiment of the present invention which enables an existing conventional telephone handset receiver to be used comfortably by users wearing earrings. FIG. 20 is a front view of the adapter embodiment generally designated 130 of the present invention. FIG. 21 is a sectional view of the adapter 130 along line 5—5 of FIG. 20 in the direction of the arrows. FIGS. 22A and 22B are sectional views of the adapter 130 along line 6—6 of FIG. 20 in the direction of the arrows. FIG. 23 shows a way to attach the adapter 130 to a conventional telephone handset receiver 150.

As shown in FIGS. 20 and 21, the adapter 130 is a thin square-shaped box consisting of a front cover 100 whose overall size and shape are about the same as those of the conventional telephone handset receiver 150, a back cover 106, a shutter 104 and a switch 102. A recessed central region 100C is made on the front cover 100 and is surrounded by a large ear-contacting area 100E to improve the comfortableness. There are two sound outlets made on the front cover 100. A center sound outlet 24 is located in the central region of the front cover 100 and consists of seven circular holes. A side sound outlet 22 consisting of 6 circular holes is located within a 0.5" border region near the lower side edge 101, which is a part of the square-shaped outside edge 100G of the ear-contacting area 100E. As shown in FIGS. 21, 22 and 23, there is a big sound incoming hole 106H located in the central region of the back cover 106 to receive the sound generated from a conventional telephone receiver 150. Referring to FIG. 21, there is a shutter 104 located between the front cover 100 and the back cover 106. The shutter 104 is large enough to cover the entire sound incoming hole 106H. There are seven clearance holes 104H on the shutter 104. These seven clearance holes 104H are used to accommodate seven holes of the center sound outlet 24.

The shutter 104 has an arm 104A, which is connected to a switch 102, as shown in FIG. 21. The switch 102 can be slid between the "CENTER" position and the "SIDE" position, as shown in FIG. 20, along a track 106T located on the back cover 106. When the switch 102 moves, the shutter 104 will slide accordingly.

When the switch 102 is in the "CENTER" position, seven clearance holes 104H are aligned with the center sound outlet 24. At the same time, the sound incoming hole 106H is fully covered by the shutter 104, as shown in FIG. 21 and FIG. 22A. Sound generated from the telephone handset receiver 150 will pass through the sound incoming hole 106H and the clearance holes 104H, and then, be transmitted out from the center sound outlet 24. Thus the telephone can be used in its normal way.

When the switch 102 is moved to the "SIDE" position, the center sound outlet 24 is blocked by the shutter 104, as shown in FIG. 22B. Because the sound incoming hole 106H is no longer fully covered by the shutter 104, sound generated from the telephone handset receiver 150 will be transmitted out from the side sound outlet 22. As described in previous embodiments, this adapter can accommodate uses with earrings.

There are many ways to attach the adapter 130 to the handset receiver 150. By using a metal or plastic slip, a rubber band or magnetic materials, the adapter 130 can be attached to the conventional handset receiver 150 temporarily. Since it is not necessary to detach any parts in order to change the operation mode, the adapter 130 can also be attached to the handset receiver 150 permanently. FIG. 23 shows that a thin gasket 120 with adhesives on both sides is used to secure the adaptor 130 to the handset receiver 150. This gasket 120 provides an airtight seal between the adapter 130 and the handset receiver 150 so that the desired acoustical efficiency can be maintained.

The above telephone handset receiver adapter embodiment 130 provides an easy way to convert a conventional handset receiver to an earring compatible one. This adapter can be temporarily or permanently attached to an existing handset receiver's front surface. Users either with or without earrings can select their desired operation mode simply by sliding a switch. This adapter provides equal comfortableness and desired acoustical efficiency to all users, regardless wearing earrings or not.

The foregoing detailed description has been given for clearness of understanding only, and no unnecessary limitations should be understood therefrom, as modification will be obvious to those skilled in the art.

What is claimed is:

1. An earring compatible receiver of a telephone handset which includes an elongated central handle portion with said receiver disposed at one end and a mouthpiece at the other, said receiver comprising:
   a case extended from said one end of said handle portion of said telephone handset, said case comprising a front surface for placement in direct proximity to the ear of a user;
   a sound generating device mounted in said case for producing audio energy;
   said front surface having two sound outlets, including a side sound outlet and a center sound outlet, for transmitting said audio energy produced by said sound generating device, each of said two sound outlets comprising a plurality of perforations, said side sound outlet being placed in a half-inch wide border region of said front surface, said center sound outlet being placed in a central region surrounded by said border region;

controlling means for alternatively transmitting said audio energy through said center sound outlet or said side sound outlet in at least two user selectable modes to accommodate all users with and without earrings.

2. The receiver of claim 1 wherein said side sound outlet is placed near a middle portion of a lower side edge of said front surface, said lower side edge facing said mouthpiece of said telephone handset.

3. The receiver of claim 1 wherein said sound generating device comprises a stationary speaker.

4. The receiver of claim 1 wherein said controlling means comprises a plurality of sound chambers for conducting said audio energy to said two sound outlets and a plurality of gaskets for preventing said audio energy from leaking within said case.

5. The receiver of claim 1 wherein said controlling means comprises a mechanical shutter to deliver said audio energy through one of said sound outlets, said mechanical shutter utilizing at least one type of movement selected from the group consisting of sliding and rotating, said controlling means also comprises means for indicating the location of said one of said sound outlets which is currently selected to transmit said audio energy.

6. The receiver of claim 1 wherein said sound generating device comprises a movable speaker, said controlling means comprises means for relocating said movable speaker in said case to deliver said audio energy through one of said sound outlets, and means for indicating the location of said one of said sound outlets which is currently selected to transmit said audio energy.

7. The receiver of claim 1 wherein said sound generating device comprises a stationary multi-channel-speaker, said controlling means comprises means for selecting and energizing an active channel from said multi-channel-speaker to deliver said audio energy through one of said sound outlets, and means for indicating the location of said one of said sound outlets which is currently selected to transmit said audio energy.

8. An earring compatible receiver of an old-style telephone handset which includes an elongated central handle portion with said receiver disposed at one end and a mouthpiece at the other, said receiver comprising:
   a case extended from said one end of said handle portion of said old-style telephone handset, said case including a cylindrical open end with an outer thread;
   a sound generating device mounted inside said case for producing audio energy;
   a detachable earpiece comprising a front surface for direct engagement with the ear of a user, said front surface having an annular outside edge and a plurality of perforations for transmitting said audio energy, said perforations being disposed in a central region forming a center sound outlet and in a border region forming a side sound outlet, said border region being about one half of an inch wide adjacent to said annular outside edge of said front surface, said central region being surrounded by said border region;
   means for attaching said earpiece onto said case;
   controlling means for alternatively transmitting said audio energy through said center sound outlet or said side sound outlet in at least two user selectable modes to accommodate all users with and without earrings.

9. The receiver of claim 8 wherein said controlling means comprises mechanical shutter means for delivering said audio energy through one of said sound outlets, and means for indicating the location of said one of said sound outlets which is currently selected to transmit said audio energy, said attaching means comprises cylindrical adapter means with inner thread means for mating with said outer thread on said cylindrical open end of said case, outer latching ring means for mounting said earpiece to said cylindrical adapter means and providing a relative rotational movability between said earpiece and said cylindrical adapter means, means for supporting said mechanical shutter means and means for maintaining a selected relative position between said earpiece and said mechanical shutter means.

10. An earring compatible adapter for a receiver of a conventional telephone handset, said handset including an elongated central handle portion with said receiver disposed at one end and a mouthpiece at the other, said receiver including a front panel with openings for emitting audio energy generated by a speaker mounted in said receiver, said adapter comprising:
   a thin case whose overall size and shape being approximately the same as those of said receiver of said conventional telephone handset, said case including a front surface for direct engagement with the ear of a user and a bottom surface for interfacing with said front panel of said receiver;
   said bottom surface of said case having a plurality of input perforations for receiving said audio energy emitted from said receiver;
   said front surface of said case having a plurality of output perforations for transmitting said audio energy, said output perforations being disposed in a half-inch border region of said front surface forming a side sound outlet and in a central region of said front surface forming a center sound outlet;
   controlling means for alternatively transmitting said audio energy through said center sound outlet or said side sound outlet in at least two user selectable modes;
   means for attaching said case onto said receiver of said telephone handset.

11. The adapter of claim 10 wherein said side sound outlet is placed near a middle portion of a lower side edge of said front surface, said lower side edge facing said mouthpiece of said telephone handset when said adapter is attached to said receiver.

12. The adapter of claim 10 wherein said controlling means comprising a mechanical shutter for delivering said audio energy through one of said sound outlets, and means for indicating the location of said one of said sound outlets which is currently selected to transmit said audio energy.

13. The adapter of claim 10 wherein said attaching means comprises both temporary and permanent mounting methods.

14. An earring compatible receiver of a telephone handset which includes an elongated central handle portion with said receiver disposed at one end and a mouthpiece at the other, said receiver comprising:
   a case extended from said one end of said handle portion of said telephone handset, said case comprising a front surface for placement in direct proximity to the ear of a user;

a sound generating device mounted in said case for producing audio energy;

said front surface having two sound outlets, including a side sound outlet and a center sound outlet, for transmitting said audio energy produced by said sound generating device, each of said two sound outlets comprising a plurality of perforations, said side sound outlet being placed in a half-inch wide border region of said front surface, said center sound outlet being placed in a central region surrounded by said border region;

controlling means for selectably transmitting said audio energy through said center sound outlet or said side sound outlet, or simultaneously through said center sound outlet and said side sound outlet in user selectable modes to accommodate all users with and without earrings.

* * * * *